(12) United States Patent
Selles et al.

(10) Patent No.: US 9,114,791 B2
(45) Date of Patent: Aug. 25, 2015

(54) ELECTRIC BRAKE FOR AN AIRCRAFT WHEEL, THE BRAKE INCLUDING AN ELECTROMECHANICAL ACTUATOR FITTED WITH A TEMPERATURE SENSOR

(71) Applicant: MESSIER-BUGATTI-DOWTY, Velizy-Villacoublay (FR)

(72) Inventors: Franck Selles, Velizy-Villacoublay (FR); Jean-Baptiste Vaney, Velizy-Villacoublay (FR); Emmanuel Colin, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 320 days.

(21) Appl. No.: 13/782,751

(22) Filed: Mar. 1, 2013

(65) Prior Publication Data
US 2013/0230075 A1    Sep. 5, 2013

(30) Foreign Application Priority Data
Mar. 2, 2012  (FR) ...................................... 12 51954

(51) Int. Cl.
*F16D 65/28* (2006.01)
*B60L 7/00* (2006.01)
(Continued)

(52) U.S. Cl.
CPC ................. *B60T 17/22* (2013.01); *B64C 25/42* (2013.01); *B64C 25/44* (2013.01); *F16D 66/00* (2013.01); *F16D 66/02* (2013.01); *F16D 55/36* (2013.01); *F16D 2066/001* (2013.01); *F16D 2121/14* (2013.01); *F16D 2121/24* (2013.01); *F16D 2125/40* (2013.01); *F16D 2125/48* (2013.01)

(58) Field of Classification Search
CPC  F16D 2121/24; F16D 55/36; F16D 2066/001
USPC .......... 374/144; 188/71.5, 156, 158, 159, 161
See application file for complete search history.

(56) References Cited

U.S. PATENT DOCUMENTS 6,918,470 B2 * 7/2005 Guaraldo ...................... 188/161
7,458,442 B2   12/2008 Kolberg
(Continued)

FOREIGN PATENT DOCUMENTS

| DE | 196 52 230 A1 | 6/1998 |
| DE | 197 24 117 A1 | 12/1998 |
| EP | 1679453 A1 | 7/2006 |

OTHER PUBLICATIONS

French Search Report for Corresponding FR 1251954.

*Primary Examiner* — Lisa Caputo
*Assistant Examiner* — Jonathan Dunlap
(74) *Attorney, Agent, or Firm* — Sughrue Mion, PLLC

(57) ABSTRACT

An electric brake for an aircraft wheel comprising a support 4 formed by a torsion tube 5 and by an actuator-carrier 6, a stack 7 of disks mounted around the torsion tube 5, electromechanical actuators 8 carried by the actuator-carrier 6, each actuator comprising an electric motor 12 and a pusher 14, the electric motor 12 being adapted to move the pusher 14 facing the stack 7 of disks in order to apply a braking force selectively to the stack 7 of disks; and temperature measurement means for measuring a temperature representative of a temperature that exists in the stack 7 of disks. The temperature measurement means comprises at least one temperature sensor 18 arranged in the pusher 14 of one of the electromechanical actuators 8 so as to be located in the immediate proximity of the stack 7 of disks when the pusher 14 is brought into contact therewith.

9 Claims, 2 Drawing Sheets

(51) Int. Cl.

| | | |
|---|---|---|
| *F16D 55/36* | (2006.01) | |
| *B60T 17/22* | (2006.01) | |
| *B64C 25/42* | (2006.01) | |
| *B64C 25/44* | (2006.01) | |
| *F16D 66/02* | (2006.01) | |
| *F16D 66/00* | (2006.01) | |
| *F16D 121/14* | (2012.01) | |
| *F16D 121/24* | (2012.01) | |
| *F16D 125/40* | (2012.01) | |
| *F16D 125/48* | (2012.01) | |

(56) References Cited

U.S. PATENT DOCUMENTS

| | | | |
|---|---|---|---|
| 2004/0154880 A1* | 8/2004 | Guaraldo | 188/71.5 |
| 2008/0092641 A1* | 4/2008 | Cahill et al. | 188/1.11 L |
| 2009/0114488 A1* | 5/2009 | Bailey et al. | 188/71.5 |
| 2012/0153753 A1* | 6/2012 | Hanlon et al. | 188/171 |

\* cited by examiner

ELECTRIC BRAKE FOR AN AIRCRAFT WHEEL, THE BRAKE INCLUDING AN ELECTROMECHANICAL ACTUATOR FITTED WITH A TEMPERATURE SENSOR

The invention relates to an electric brake for an aircraft wheel, the brake including an electromechanical actuator fitted with a temperature sensor.

BACKGROUND OF THE INVENTION

The braking systems in most modern aircraft comprise brakes having disks of steel or carbon stacked around a torsion tube, together with braking actuators carried by a ring and controlled to apply a braking force against the disks in order to exert a braking torque on the braked wheels of the aircraft, tending to slow the aircraft down. Generally, the braked wheels are the wheels of the main landing gear of the aircraft.

A distinction is drawn between hydraulic brakes, in which the actuators are fed with a pressurized fluid and include a piston, and electromechanical brakes, in which the actuators are powered electrically and include an electric motor adapted to move a pusher.

The time required for brake disks to cool down is a parameter that is crucial for defining the turnaround time (TAT) of an aircraft. The TAT is the minimum time to be allowed between two flights of an aircraft, i.e. the time during which the aircraft must remain on the ground after landing and before takeoff. In addition to cooling the brake disks, numerous parameters are involved in defining the TAT, including the time required for allowing passengers to leave the aircraft and to enter it, the time required to fill its tanks with fuel, the time required for maintenance operations, etc.

Before takeoff, it is important for the temperature of the stack of disks to be less than a safe maximum temperature above which braking performance is degraded (in the event of emergency braking during takeoff), and above which there is a real danger of fire once the landing gear enters into the wheel bays in the retracted position, in particular in the event of hydraulic fluid being projected onto the brake disks.

In order to measure the temperature of the stack of disks, it is known to make use of a temperature sensor installed in a cavity of the torsion tube of the brake. The sensor is then heated by radiation and by conduction via the tube, which is detrimental to the representative nature of the measurement.

This measurement uncertainty makes it necessary to take a certain margin into account between the temperature delivered by the sensor and the safe maximum temperature.

This margin has the effect of increasing the time required for cooling the brakes, and thus of increasing the TAT.

OBJECT OF THE INVENTION

The object of the invention is to propose an electric brake for an aircraft wheel, the brake being fitted with a temperature sensor that enables TAT to be reduced.

SUMMARY OF THE INVENTION

In order to achieve this object, the invention provides an electric brake for an aircraft wheel, the brake comprising:
    a support formed by a torsion tube and by an actuator-carrier;
    a stack of disks mounted around the torsion tube;
    electromechanical actuators carried by the actuator-carrier, each actuator comprising an electric motor and a pusher, the electric motor being adapted to move the pusher facing the stack of disks in order to apply a braking force selectively to the stack of disks; and
    temperature measurement means for measuring a temperature representative of a temperature that exists in the stack of disks.

According to the invention, the temperature measurement means comprise at least one temperature sensor arranged in the pusher of one of the electromechanical actuators so as to be located in the immediate proximity of the stack of disks when the pusher is brought into contact therewith.

Thus, when the pusher comes into contact with a disk of the stack of disks, the temperature of the stack of disks is measured as close as possible to the disks, and heat is transmitted to the sensor by conduction. This measurement is thus more representative of the temperature of the disks, and it thus makes it possible to reduce the temperature margins used for determining TAT, thereby making it possible to shorten TAT.

The invention also provides an electromechanical actuator that is specially adapted to be mounted in an electric brake as defined above.

The invention also provides a method of using an electric brake as described above, the method comprising the following steps:
    moving the pusher until it is in contact with a disk of the stack of disks; and
    acquiring a temperature measurement by means of the temperature sensor housed in the pusher.

It is thus possible for the pilot and for the on-board systems of the aircraft to measure the temperature of the stack of disks:
    while the aircraft is in a braking stage;
    while the aircraft is in flight, by causing the pusher fitted with the probe to come into contact with the stack of disks; and
    while the aircraft is stationary on the ground, and when the pilot actuates the brake so that the pusher comes into contact with the stack of disks.

Finally, the invention also provides a method of measuring the temperature of the stack of disks of an electric brake such as that described above, the brake being provided with one or more temperature sensors housed in one or more pushers, the method comprising the following steps:
    acquiring measurements delivered by the temperature sensors by causing the pushers carrying said temperature sensors to come into contact with the disks;
    for each temperature sensor, comparing the measurement delivered by that temperature sensor with the measurements delivered by the other temperature sensors;
    determining whether each of the measurements is or is not consistent with the other measurements; and
    rejecting inconsistent measurements.

The temperature sensor redundancy made possible by positioning the sensors in the actuators guarantees that the measurement of the temperature of the disks is robust.

BRIEF DESCRIPTION OF THE DRAWINGS

The invention can be better understood in the light of the following description with reference to the figures of the accompanying drawings, in which.

DETAILED DESCRIPTION OF THE INVENTION

Figure 1:
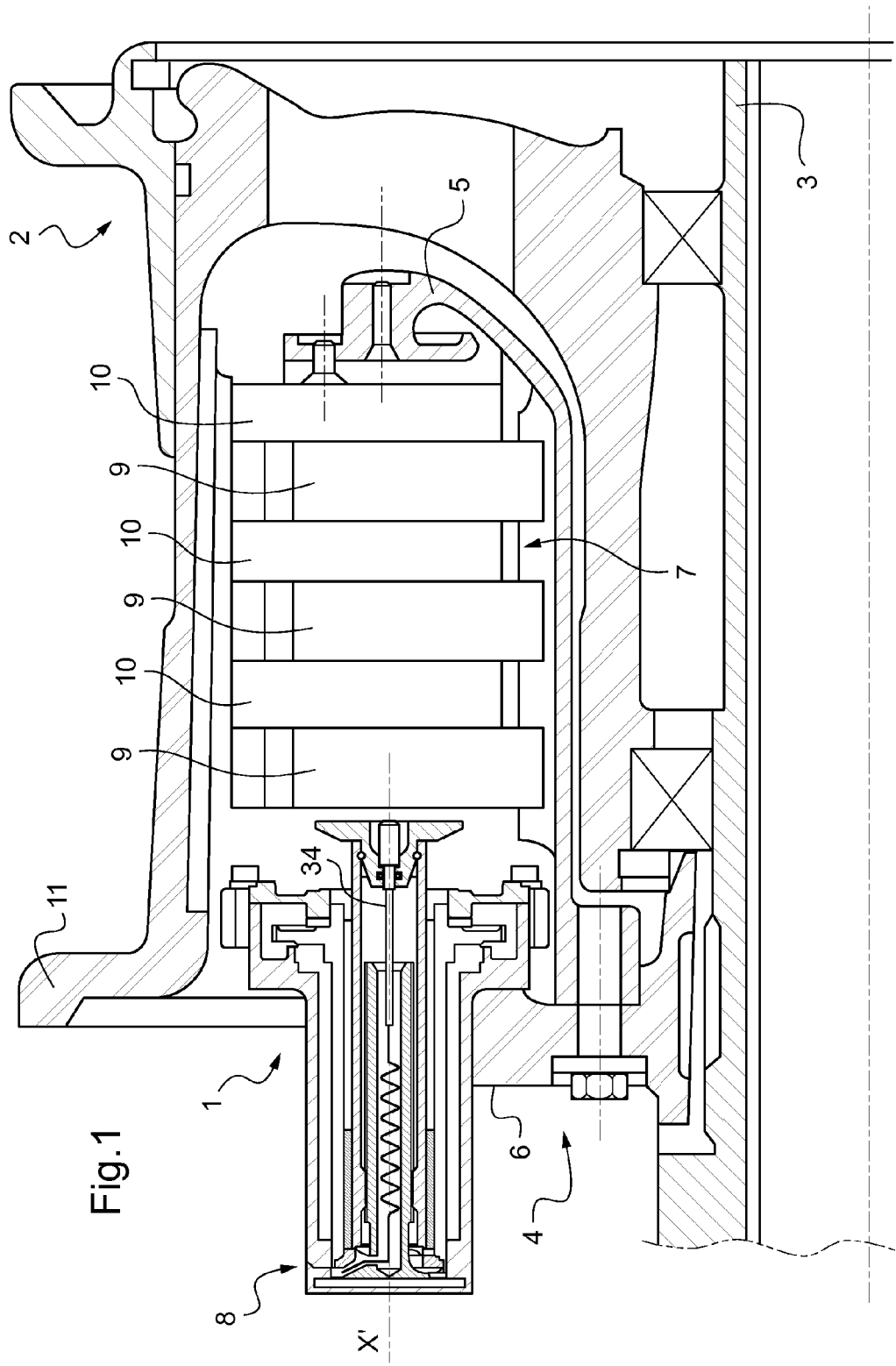
FIG. 1 is a section view of an aircraft half-wheel provided with an electric brake including an electromechanical actuator of the invention.

The electric brake 1 shown in FIG. 1 is for braking an aircraft wheel 2 mounted on an axle 3 of axis X. The electric brake 1 includes a support 4 constituted by a torsion tube 5 and an actuator-carrier 6, a stack 7 of carbon disks mounted around the torsion tube 5, and at least one electromechanical actuator 8 carried by the actuator-carrier 6.

The carbon disks comprise stator disks 9 constrained in rotation with the torsion tube 5, and rotor disks 10 constrained in rotation with a rim 11 of the wheel 2.

Figure 2:
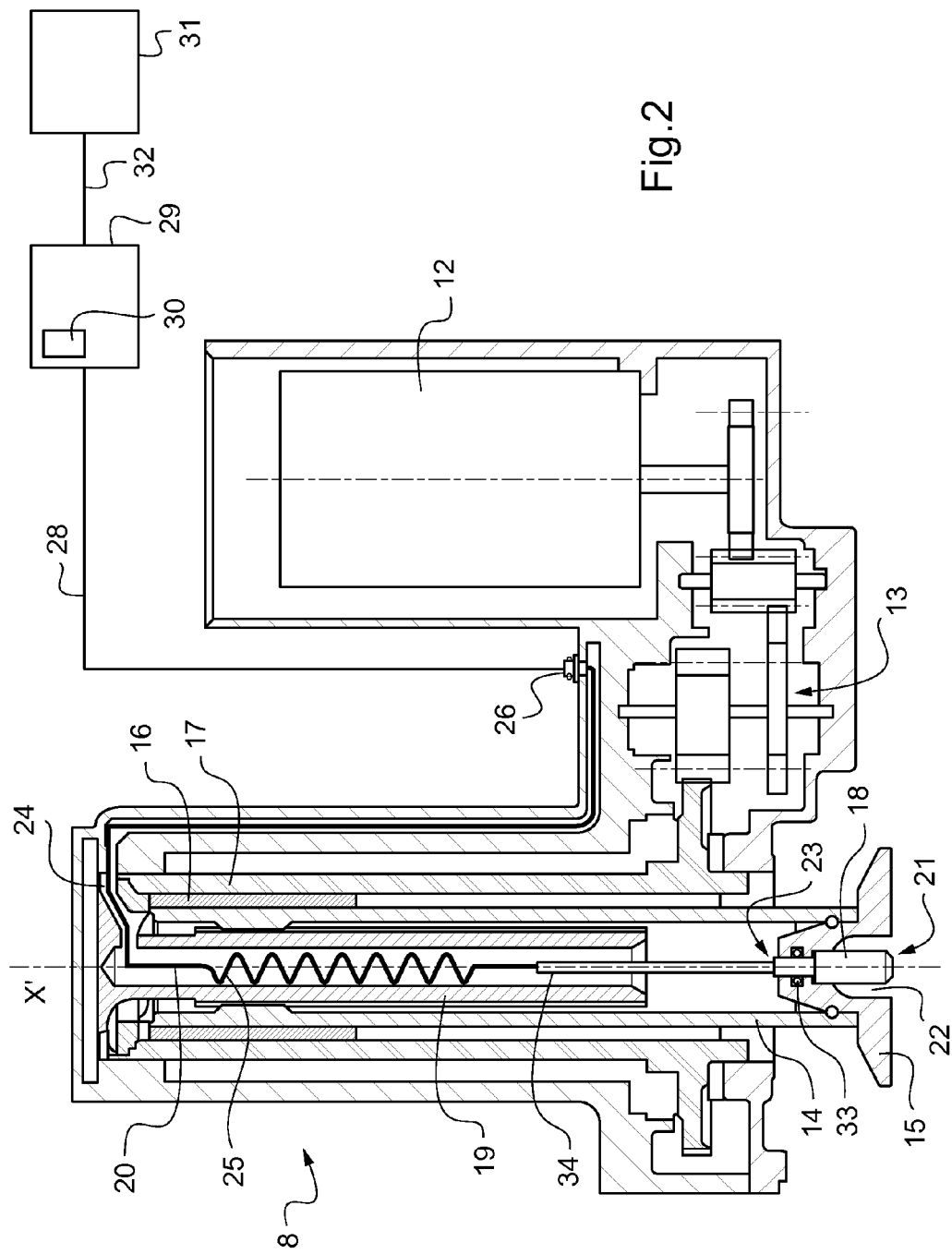
FIG. 2 is a longitudinal section view of the electromechanical actuator of the invention.

The electromechanical actuator 8, visible in FIG. 2, comprises a pusher 14 having a shoe 15. The pusher 14 is arranged to slide longitudinally along an axis X'. The pusher 14 is threaded and co-operates via a helical connection provided with a nut 17 mounted to rotate about the axis X'. The nut 17 is itself driven in rotation by an electric motor 12 via step-down gearing 13. Rotating the motor 12 thus causes the pusher 14 to move facing the stack 7 of disks in order to apply a braking force selectively thereagainst. The portion 14 is prevented from turning by cooperating with a fluted central rod 19. All this is well-known and is recalled merely to give the context of the invention.

According to the invention, the electromechanical actuator 8 includes a temperature sensor, here a thermocouple probe 18, which sensor is fastened to a protective sheath 34. The probe 18 is mounted in the shoe 15 of the pusher 14.

In this example, the probe 18, is a type K thermocouple probe, and comprises two wires 20, a Chromel wire and an Alumel wire, represented in FIGS. 1 and 2 by a single bold line. The wires 20 are connected together by a junction referred to as a "hot weld". The hot weld, which is the sensitive portion of the probe 18, is situated inside the probe 18 at a first end 21 of the probe 18. This first end 21 of the probe 18 extends inside a cavity 22 of the shoe 15, so that the hot weld is in the immediate proximity of the front stator disk 9 of the stack 7 of disks when a braking force is applied.

A sealing gasket 33, situated at a second end 23 of the probe 18, serves to prevent outside elements, such as water or carbon dust for example, from entering into the inside of the actuator.

At the output from the probe 18, the wires 20 extend within a protective sheath 34. The sheath 34 is fastened to the second end 23 of the probe 18, and it extends longitudinally inside the pusher 14 along the axis X' inside the rod 19. At the outlet from the sheath 34, the wires 20 pass through the electromechanical actuator 8, inside the pusher 14 and then inside a duct 24 formed in the body of the actuator 8. An extra length 25 of wire is provided to allow the pusher 14 to move in translation without stressing the wires 20 when the pusher 14 slides towards the stack 7 of disks in order to apply a braking force, or on the contrary whenever it slides in the opposite direction to move the shoe 15 away from the stack 7 of disks.

Thereafter, the wires 20 are connected to an electrical connector 26 of the actuator 8. The connector 26 enables the wires 20 to be connected to wires 28 that connect the actuator 8 to remote equipment 29 situated on an undercarriage that has the axle 3 fastened thereto, or situated in some other portion of the aircraft. The wires 28 are represented in FIG. 2 as a single line. The remote equipment 29 has a second temperature sensor 30, e.g. a thermistor.

The wires 20 of the probe 18, and also the wires 28, are of the Chromel/Alumel type as far as the remote equipment 29. The junction between these wires at the remote equipment 29 is referred to as the "cold weld" of the thermocouple.

The second temperature sensor 30 is adapted to measure the temperature T2 of the cold weld. An electrical member 31 acquires:

the potential difference between the hot weld point and the cold weld point, thus making it possible to estimate the temperature difference $\Delta T$ between the hot weld and the cold weld; and the temperature T2 of the cold weld.

From these values, the electrical member 31 deduces the temperature T1 of the brake 1 as follows:

$$T1 = \Delta T + T2.$$

It should be observed that wires 32 that connect the remote equipment 29 with the electrical member 31 and serving to convey a signal coming from the probe 18 to the electrical member 31, are constituted by wires made of copper and not wires made of Chromel/Alumel.

It is thus possible for the pilot and for the on-board systems of the aircraft to measure the temperature of the stack of disks:
while the aircraft is in a braking stage;
while the aircraft is in flight, by causing the pusher fitted with the probe to come into contact with the stack of disks; and
while the aircraft is stationary on the ground, and when the pilot actuates the brake so that the pusher comes into contact with the stack of disks.

When the electric brake 1 has a plurality of electromechanical actuators 8, it is advantageous for each of the actuators to be fitted with a respective probe 18. This redundancy makes it possible to guarantee that the measurement is available even in the event of a probe failing.

This redundancy also makes it possible to make the system much better at withstanding failures of the kind in which the data it transmits is said to be "erroneous but credible". Such data is wrong data and results from a permanent or temporary failure of a sensor, however it lies within a plausible measurement range, thereby making it difficult to detect the failure. To make the measurement more robust by eliminating this type of failure, it is possible to apply a method consisting in comparing the values delivered by the various temperature sensors with one another, and in eliminating values that are inconsistent. This comparison may be performed by the electrical member 31.

The method of making the measurement more robust comprises the following steps:
acquiring measurements delivered by the temperature sensors 18 by causing the pushers 14 carrying said temperature sensors 18 to come into contact with the disks;
for each temperature sensor, comparing the measurement delivered by that temperature sensor with the measurements delivered by the other temperature sensors 18;
determining whether each of the measurements is or is not consistent with the other measurements; and
rejecting inconsistent measurements.

In an emergency or in addition, provision may be made to use a temperature sensor situated other than in an actuator, e.g. situated in the torsion tube. For example, when the method of making the measurement more robust is applied, and when the brake has only two temperature sensors situated in two actuators that are delivering measurements that are inconsistent, it is possible to decide to eliminate the data from both sensors and to use an emergency temperature sensor.

The invention is not limited to the particular embodiment described above, but on the contrary, covers any variant coming within the ambit of the invention as defined by the claims.

Although the actuator described has only a single temperature sensor, it is possible to provide an actuator with a plurality of temperature sensors. Under such circumstances, it is possible to adapt the method of improving the robustness of the measurement to a plurality of sensors in a single actuator or to all of the sensors of the brake.

Although an electrical member and remote equipment containing the cold weld are described above, it is possible for the electrical member to contain the cold weld. Under such circumstances, the wires of the sensor are of the Chromel/Alumel type as far as the electrical member.

Finally, it is possible for the shoe of the pusher to come into contact, not directly with a stator disk, but with a contact plate fastened to the stator disk that is closest to the shoe, or indeed that is fastened to the torsion tube and that is positioned between the shoe and the stator disk nearest to the shoe.

The invention claimed is:

1. An electric brake for an aircraft wheel, the brake comprising:
    a support (4) that may be formed by a torsion tube (5) and by an actuator-carrier (6);
    a stack (7) of disks mounted around the torsion tube (5);
    at least one electromechanical actuator (8) carried by the actuator-carrier (6), each actuator comprising an electric motor (12) and a pusher (14), the electric motor (12) being adapted to move the pusher (14) facing the stack (7) of disks in order to apply a braking force selectively to the stack (7) of disks; and
    temperature measurement means for measuring a temperature representative of a temperature that exists in the stack (7) of disks;
    the electric brake being characterized in that the temperature measurement means comprise at least one temperature sensor (18) arranged in the pusher (14) of one of the electromechanical actuators (8) so as to be located in the immediate proximity of the stack (7) of disks when the pusher (14) is brought into contact therewith.

2. An electric brake according to claim 1, wherein each actuator (8) is fitted with a temperature sensor (18) arranged in the pusher (14).

3. An electromechanical actuator specially adapted to be mounted in an electric brake including a stack of disks and in accordance with claim 2, the actuator comprising:
    a pusher (14); and
    an electric motor (12) adapted to move the pusher facing the stack (7) of brake disks in order to apply a braking force selectively on the stack (7) of disks;
    the actuator being characterized in that the pusher (14) includes at least one temperature sensor (18) arranged so as to be located in the immediate proximity of the stack (7) of disks when the pusher (14) is brought into contact therewith.

4. An electromechanical actuator according to claim 3, wherein at least one temperature sensor (18) is a thermocouple probe.

5. An electromechanical actuator specially adapted to be mounted in an electric brake including a stack of disks and in accordance with claim 1, the actuator comprising:
    a pusher (14); and
    an electric motor (12) adapted to move the pusher facing the stack (7) of brake disks in order to apply a braking force selectively on the stack (7) of disks;
    the actuator being characterized in that the pusher (14) includes at least one temperature sensor (18) arranged so as to be located in the immediate proximity of the stack (7) of disks when the pusher (14) is brought into contact therewith.

6. An electromechanical actuator according to claim 5, wherein at least one temperature sensor (18) is a thermocouple probe.

7. A method of using an electric brake comprising:
    a support (4) that may be formed by a torsion tube (5) and by an actuator-carrier (6);
    a stack (7) of disks mounted around the torsion tube (5);
    at least one electromechanical actuator (8) carried by the actuator-carrier (6), each actuator comprising an electric motor (12) and a pusher (14), the electric motor (12) being adapted to move the pusher (14) facing the stack (7) of disks in order to apply a braking force selectively to the stack (7) of disks; and
    temperature measurement means for measuring a temperature representative of a temperature that exists in the stack (7) of disks;
    the electric brake being characterized in that the temperature measurement means comprise at least one temperature sensor (18) arranged in the pusher (14) of one of the electromechanical actuators (8) so as to be located in the immediate proximity of the stack (7) of disks when the pusher (14) is brought into contact therewith, the method comprising the following steps:
    moving the pusher (14) until it is in contact with a disk of the stack (7) of disks; and
    acquiring a temperature measurement by means of the temperature sensor (18) housed in the pusher (14).

8. A method of using an electric brake according to claim 7, wherein each actuator (8) is fitted with a temperature sensor (18) arranged in the pusher (14).

9. A method of measuring the temperature of the stack (7) of disks in an electric brake comprising:
    a support (4) that may be formed by a torsion tube (5) and by an actuator-carrier (6);
    a stack (7) of disks mounted around the torsion tube (5);
    at least one electromechanical actuator (8) carried by the actuator-carrier (6), each actuator comprising an electric motor (12) and a pusher (14), the electric motor (12) being adapted to move the pusher (14) facing the stack (7) of disks in order to apply a braking force selectively to the stack (7) of disks; and
    temperature measurement means for measuring a temperature representative of a temperature that exists in the stack (7) of disks;
    the electric brake being characterized in that the temperature measurement means comprises at least one temperature sensor (18) arranged in the pusher (14) of one of the electromechanical actuators (8) so as to be located in the immediate proximity of the stack (7) of disks when the pusher (14) is brought into contact therewith,
    wherein the brake being provided with a plurality of temperature sensors (18) housed in one or more pushers (14), the method comprising the following steps:
    acquiring measurements delivered by the temperature sensors (18) by causing the pushers (14) carrying said temperature sensors (18) to come into contact with the disks;
    for each temperature sensor (18), comparing the measurement delivered by that temperature sensor (18) with the measurements delivered by the other temperature sensors (18);
    determining whether each of the measurements is or is not consistent with the other measurements; and
    rejecting inconsistent measurements.

* * * * *